United States Patent Office 3,118,266
Patented Jan. 21, 1964

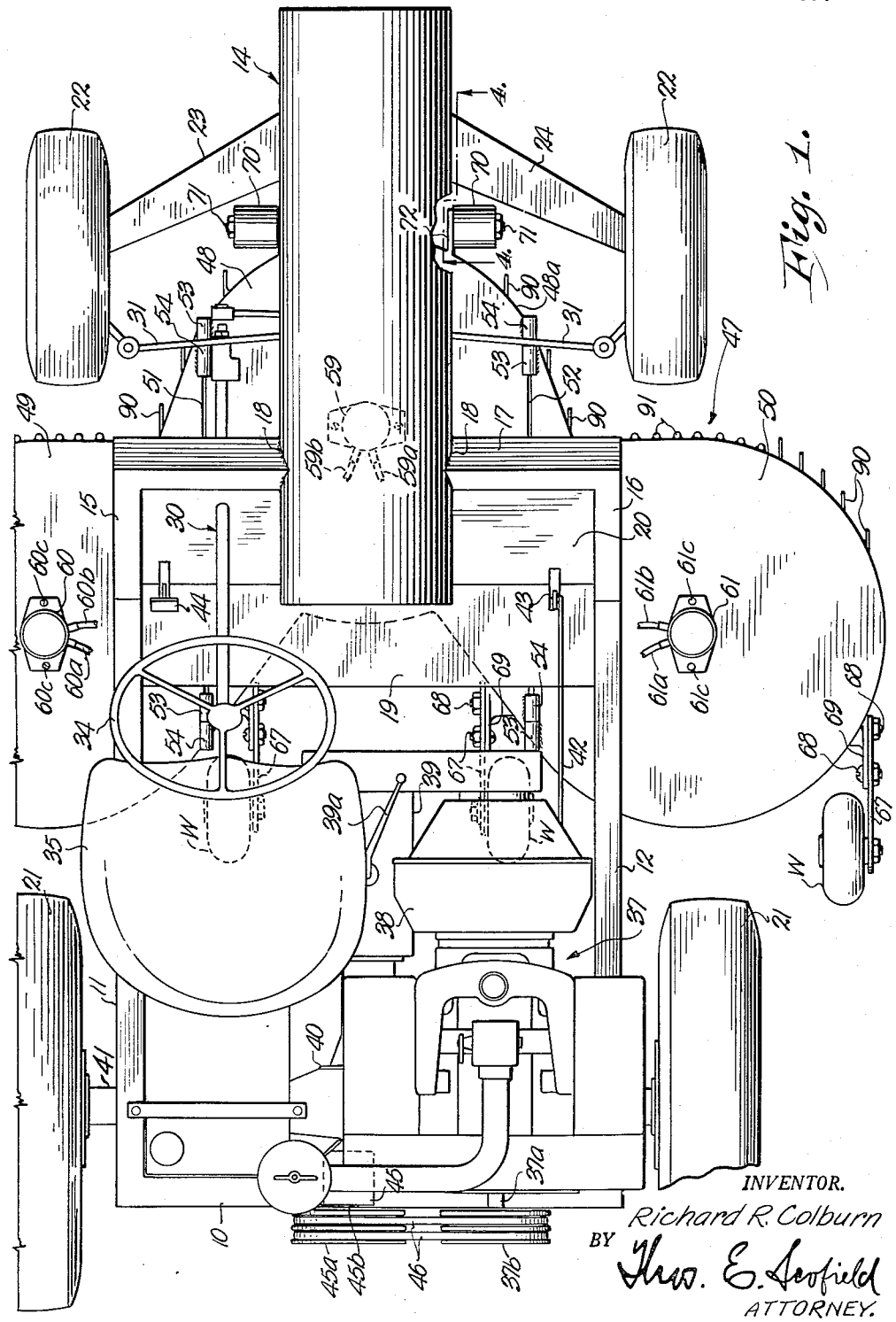

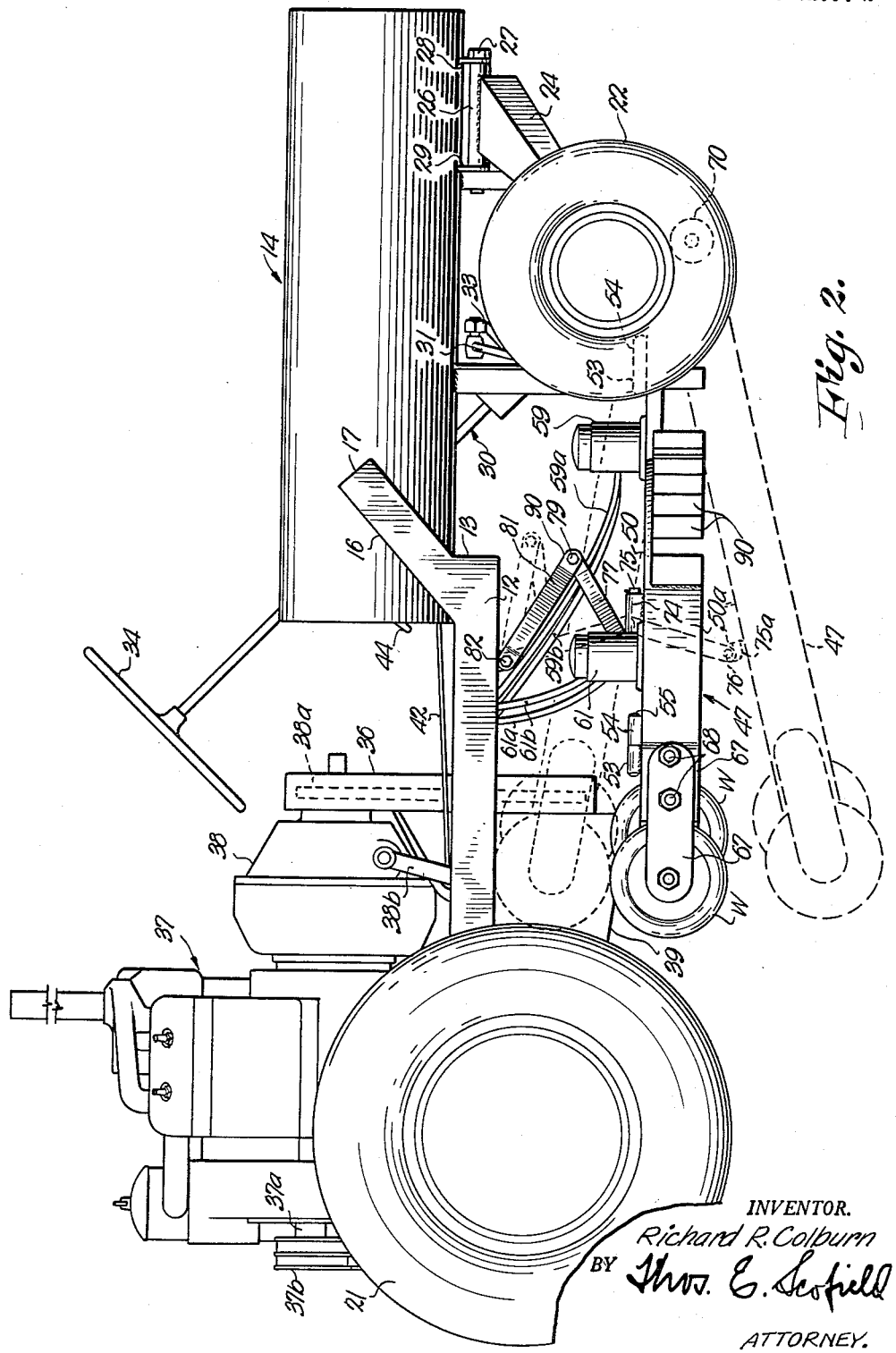

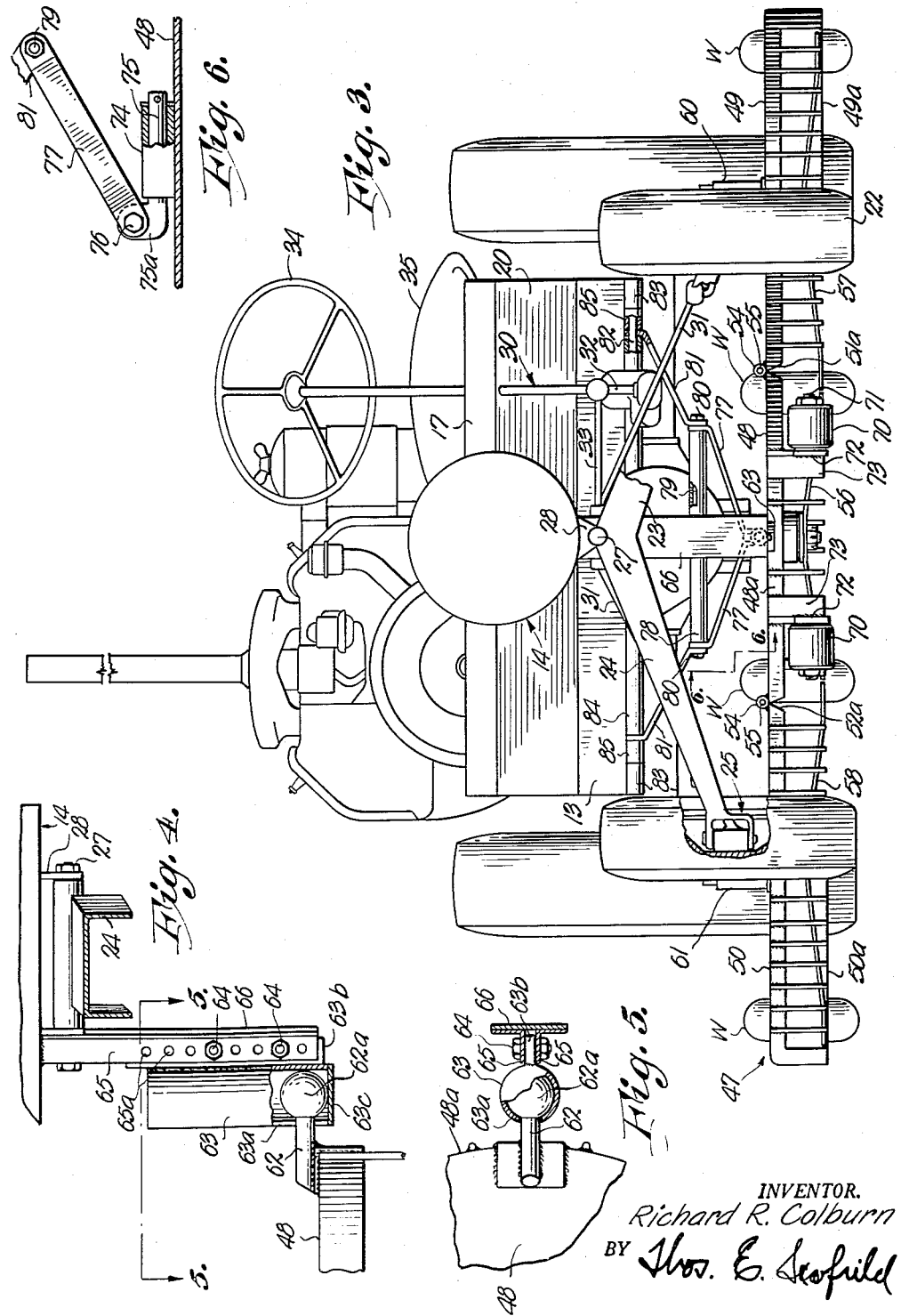

3,118,266
RIDING TYPE POWER MOWER WITH
FLOATING BLADES
Richard R. Colburn, 5507 N. Palo Cristi Road,
Phoenix, Ariz.
Filed Feb. 2, 1961, Ser. No. 86,747
12 Claims. (Cl. 56—25.4)

This invention relates to power operated self-propelling mowers and refers more particularly to a riding type mower having particularly advantageous features in connection with obtaining optimum floating and independent motion of the blades relative to the ground and the chassis of the unit in order to obtain evenness of cut and to prevent scalping and the like.

One of the important objects of the invention is to provide a riding type mower which is compact and easy to operate, yet in which the mower housing is supported for substantially free floating movement relative to the chassis and thus is capable of closely following changing ground contours so as to maintain the blade or blades at substantially constant spacing from the ground. In my prior Patents 2,801,510 and 2,869,304 I have disclosed riding type mowers directed toward the general purpose herein contemplated. However, the present invention represents in certain respects marked improvements over the arrangements therein disclosed, not only from the standpoint of increased freedom and independent floating action for the blades, but also in making possible a much wider cut or swath in a single pass of the unit.

A further object of the invention is to provide a riding type power mower which is singularly advantageous for use in obtaining a wide but smooth and even cut on sharply changing and inclined topography. While the structure herein disclosed is capable of embodiment in a standard size unit, say one providing a 24 inch to 50 inch swath, it finds its most valuable employment in connection with swaths 60 inches or greater. Heretofore work of this type has been handled by accessory mowers adapted to be connected with or ganged behind conventional tractors. The present invention substitutes for this sometimes cumbersome and relatively expensive arrangement an integrated riding unit which is operable at a fraction of the horsepower supplied by conventional tractors and which in sum is cheaper to build and to operate.

Still another object of the invention is to provide a riding type mower of the character described in which the drive to the blades is unaffected by the rise and fall and rocking motion of the latter as they are shifted according to ground contours during use. It is a feature of the invention in this respect that the blades are driven through hydraulic means, with the unit so designed that the reservoir component of the hydraulic system serves also as a part of the structural frame of the unit. The utilization of hydraulic drive for the blades has eliminated many of the problems attendant upon maintaining a continuous belt drive in combination with free floating mounting of the cutter blade, particularly where it is attempted to drive blades which are capable of movement relative to one another.

A further object of the invention is to provide a multiple blade mower in which all blades are supported in such fashion that they are all capable of rising and falling movement relative to one another.

Another object of the invention is to provide a riding type mower of the character described in which the supporting wheels for the chassis can be given a greater span than heretofore thought possible while still preserving the contour following or floating action of the mower housing. This feature is particularly valuable in providing mowers which will obtain an even cut on relatively steep side inclines and yet which will be stable enough to present little danger of overturning.

A further object of the invention is to provide a suspension and guide mechanism for under-mounted mower housing which makes it possible to cut wide swaths with contour following action, and yet in which the mower is maintained in straight line tracking relationship with the carrier vehicle despite the existence of severe lateral forces on the housing.

Other and further objects of the invention together with the features of novelty appurtenant thereto will appear in the course of the following description.

In the accompanying drawings which form a part of the specification and are to be read in conjunction therewith, and in which like reference numerals indicate like parts in the various views:

FIG. 1 is a top plan view of a mowing unit embodying the invention, fragmentary portions of one housing section and the rear wheels being broken off and other parts broken away for purposes of illustration;

FIG. 2 is a side elevational view showing the near side of the unit as viewed in FIG. 1;

FIG. 3 is a front end elevational view of the unit, parts again being broken away for purposes of illustration;

FIG. 4 is an enlarged fragmentary sectional view taken generally along the line 4—4 of FIG. 1 in the direction of the arrows;

FIG. 5 is a sectional view taken along line 5—5 of FIG. 4 in the direction of the arrows; and FIG. 6 is a fragmentary sectional view taken along line 6—6 of FIG. 3 in the direction of the arrows.

Referring now to the drawings, the chassis of the unit is best seen in FIGS. 1, 2 and 3. The frame of the chassis comprises an open rectangular rear portion made up as interconnected structural members defining a rear crossbar 10, laterally spaced forwardly extending side rails 11 and 12 and a front crossbar 13 (see FIG. 3). The bars and rails may conveniently be formed as channel sections welded at their ends to one another to provide a rigid structure lying substantially in a horizontal plane. Rigidly connected with the front crossbar 13 and extending forwardly thereof is the cylindrical tank 14. The tank 14 serves as an integral structural part of the frame of the vehicle. Upwardly and forwardly inclined side rail extensions 15 and 16 join with an upper crosspiece 17 which is cut away to receive the tank, the cut ends being joined to the tank by welds 18. Preferably a floor section 19 bridges between the rails 11 and 12, the floor section merging at its forward end with an upwardly inclined fire wall or dash 20 which is supported at its edges by the side rail extensions 15 and 16 and the front crosspiece 17. The wall 20 is likewise cut out to accommodate the tank 14, being welded thereto along the edge of the cut.

The frame is supported by the rear wheels 21 and front wheels 22. The front wheels are mounted at the outer ends of the swept back legs 23, 24 of a front wheel yoke. Conventional steering knuckles, a typical one of which is seen generally at 25 in FIG. 3, serve to connect the wheels with the ends of the yoke. The upper end of the yoke is connected centrally to the underside of tank 14 through the medium of a bearing sleeve 26 which is journaled on a pin 27. The pin is secured to the tank by depending brackets 28, 29 which are welded or otherwise secured to the tank. Thus the yoke is free to rock relative the frame of the unit about the axis defined by pin 27.

The steering mechanism for the front wheels is conventional, being schematically exemplified in the drawings by the steering shaft or column 30 and a pair of tie rods 31 which extend outwardly to connect with the knuckles. The lower end of shaft 30 is connected with the tie rods through the steering arms 32 and 33. Since the details of the steering mechanism play no part in the invention, further description is believed unnecessary.

The upper end of the steering shaft is fitted with the steering wheel 34 which is located in operating proximity to the seat 35. The seat 35 is supported on the frame by suitable bracing (not shown) including the usual leaf spring (not shown). It will be noted that both the seat 35 and steering shaft or column 30 are offset to one side of the fore and aft center line of the frame.

The power source for the unit comprises the engine 37 which is coupled through a clutch 38 and chain drive 38a to a transmission 39 which terminates in a differential 40 forming a part of the rear axle 41. The chain drive is contained within housing 36. I have not attempted to show the details of the drive components since they are available on the market. For my purposes I have chosen a Wisconsin V4 30 horsepower engine and a Willis clutch transmission and rear end. The clutch is provided with an arm 38b which is operably connected through link 42 and lever arm 43 to the operating pedal 44. It will be understood that pedal 44 and lever 43 are keyed to a common cross shaft (not shown) so that depression of the pedal causes displacement of the lever in a direction to disengage the clutch. The transmission is provided with the usual shifting hand lever 39a positioned to be accessible from the seat. On a commercial machine a brake will also be included, but again this forms no part of the invention, and consequently has not been shown.

Located at the rear of the engine 37 is a power take-off including the shaft 37a and double track sheave 37b. The power take-off is drivingly connected with a hydraulic pump 45 through the medium of belts 46 which are trained around a second double track sheave 45a which is secured to the shaft 45b drivingly connected with the pump. The pump 45 is secured to the rear crossbar 10 of the frame in any desired fashion.

Located beneath the frame and between the front and rear wheels is the mowing mechanism, the main element of which comprises the housing or blade mounting platform 47. The plan of the housing is generally similar to that shown in my earlier Patent 2,869,304, being adapted for the mounting of three blades which have serially overlapping cutting paths as the unit is propelled forwardly.

In the preferred embodiment of the invention, the housing 47 is subdivided into three sections; the central section 48 having the rounded generally semi-circular leading edge 48a, and two flanking and generally trailing side or wing sections 49 and 50, respectively. The wing sections 49 and 50 form continuations of the central section and are hingedly connected therewith along axes which are parallel with the longitudinal axis of the chassis, that is, the normal path of straight line advance. The line of division between the wing section 49 and central section 48 is indicated at 51, and between the central section and the wing 50 at 52. The hinge connection is provided at two locations along each line, each hinge comprising two aligned hinge barrels 53 and 54 secured respectively by welding to the adjoining housing sections and connected by a common pin 55. The four hinges are best seen in FIG. 1. It will be noted from FIG. 3 that the confronting edges of the adjoining sections of the housing are relieved along the line of juncture (as at 51a and 52a) in order to permit limited downward movement of each wing section 49 or 50 relative the central section 48. The extent of relief should be so limited as to cause binding before the tips of the outermost blades reach the underside of the central section 48.

As has been earlier mentioned, each section of the housing carries its own blade, the individual blades being identified respectively by reference numerals 56, 57 and 58. Each blade is drivingly connected by suitable shafting to a corresponding hydraulic motor 59, 60 or 61 which is secured to the top of the housing section which carries the particular blade, as by bolts 62. The hydraulic motors are of conventional commercially available construction. I have selected for the purposes of the invention 2500 r.p.m. 5 horsepower motors. Each motor is connected in the usual fashion with the pump by means of an input line 59a, 60a, or 61a, and has a return line 59b, 60b, or 61b.

The tank 14, in addition to functioning as a structural part of the chassis, serves as the reservoir for hydraulic fluid. The return lines 59b, 60b or 61b are connected with the reservoir in the usual fashion employed in hydraulic systems. To preserve clarity in the drawings I have not shown the complete piping system as it is believed that this will be evident to those skilled in this art. Obviously the pump 45 has its inlet side connected with the tank 14 so as to draw hydraulic fluid therefrom as needed and its discharge connected with the respective input lines to the motors through the usual pressure compensating flow controllers and a manually operable two-way valve permitting selected diversion of the fluid directly from the pump to the reservoir when it is desired to discontinue operation of the motors.

The input and return lines of the respective motors are of flexible construction so that the mower housing sections can rise and fall and rock relative to the frame and one another without interrupting the power supply to the motors.

Taking up now the arrangement for supporting the mower housing and its sections 48, 49 and 50, and referring first to the central section 48, the forward end of this section is provided with a forwardly extending connector member 62 (FIG. 4) terminating in a ball-like head 62a. The ball 62a is confined for vertical and rotational movement in a hollow cylindrical guide member 63 having a vertical slot 63a running substantially from the bottom to top and permitting upward displacement of the connector member with respect to the guide. The guide member 63 has a vertical flange 63b on the side opposite from the slot. This flange is provided with a pair of spaced apertures adapted to receive bolts 64. The flange is received between a pair of spaced legs 65 which extend from and are secured to a depending bracket 66 in turn secured at its upper end, as by welding, to the bottom of tank 14. The legs 65 of the bracket are provided with a plurality of spaced apertures 65a and it will be evident that the elevation of the guide 63 relative to the tank can be adjusted by removing the bolts, moving the guide up or down, and reinserting the bolts.

The bracket 66, guide 63 and connector 62 combine to provide the front suspension for the mower housing. The bottom 63c of the guide serves as a bottom stop for the ball 62a. The vertical location of the guide on the bracket determines the normal spacing of the lead end of the housing from the ground. However, it will be evident that should any upward force be applied to the lead end, the housing is free to lift relative to the guide, the ball moving upwardly in the guide. The ball and guide cylinder arrangement makes for complete freedom of the housing to simultaneously rock and rotate, except as limited by engagement of the connector arm 62 with the edges of the guide slot 63a or of the connector or housing with the guide, and this is true at any position of the ball within the guide cylinder. In other words, up and down rocking movement of the housing is limited only by the spacing of the housing from the guide and diameter of the ball, while there is no limit in the connection itself on rotation of the housing about an axis passing centrally through the connector member 62 and the center of the ball.

The rearward portions of the housing sections 48, 49 and 50 are supported at the desired elevation relative the ground by the ground engaging wheels W, of which in the preferred embodiment there are four. Each flanking or wing section 49 and 50 is provided with a wheel W located near its outer extremity while the center section 48 is provided with two wheels W, one on each side of the center line and preferably closely adjacent the lines of division 51 and 52 between the sections. The wheel mountings are substantially identical, each having a plate 67 to which the wheel is journaled and which is connected as by bolts 68 to a bracket 69 integral with and extending from the periphery of the housing. It may be desired in some instances, particularly where the unit is expected to negotiate sharp turns, to caster the wheels as generally disclosed in my Patent 2,801,510.

The forward end of the central housing section 48 is provided on opposite sides of its longitudinal center line with a pair of ground engageable rollers or small diameter wheels 70. As best seen in FIG. 3, the rollers 70 are journaled on horizontal axles 71 which are connected at their inner ends with mounting brackets 72 extending forwardly of the housing. The brackets 72 are in turn welded or otherwise affixed to narrow depending section 73 integral with the housing. The rollers 70 are so located and dimensioned as to normally be spaced slightly above the plane of engagement of the front and rear wheels of the chassis with the ground, and thus on level ground they will be out of contact with the ground. However, it will be evident that bumps or hillocks of lesser width than the span of the front wheels, and in the path of the roller 70, will engage same to apply lifting force to one or the other or both, and thus to the housing. The suspension connection previously described permits the housing to be displaced relative the frame in response to such forces, thus maintaining the blade at the desired cutting level with respect to the irregularity in ground contour.

The longitudinal center line of the central housing section 48 is substantially stabilized in a fixed plane relative to the frame through the medium of a link mechanism which serves to connect the central housing section with the frame at a point to the rear of the front suspension means. Referring to FIGS. 2, 3 and 6, it will be observed that located on the center line and secured to the top of the housing is a bearing sleeve 74 having its axis aligned with the center line. Rotatably journaled in sleeve 74 is a shaft or pin 75 having at its rearmost end an enlarged head 75a which is apertured to rotatably receive a cross-pin or bolt 76. The head is offset slightly from the axis of the shaft 75 so as to permit substantial rotation of the housing relative to the shaft without interference between the top of the housing and the head or parts connected therewith.

The bolt 76 serves to pivotally connect to the shaft 75 the lower ends of a pair of converging symmetrical legs 77. The upper ends of legs 77 are spaced apart by a tube-like spacer 78 which has journaled therein an elongate pin 79 having threaded ends adapted to receive nuts 80. Journaled on the ends of pin 79 inside the nuts are the lower ends of a second pair of downwardly converging symmetrical legs 81. The upper ends of the legs 81 are in turn journaled on a cross-shaft 82 which spans between and is affixed by brackets 83 to the undersides of the side rails 11 and 12 of the frame. The legs are restrained against longitudinal movement on the cross-shaft 82 by the central elongate tube spacer 84 and the shorter spacers 85 disposed between the legs and brackets 83.

As is believed evident from the foregoing description and the drawing, the pivotally interconnected pairs of legs 77 and 81 serve to form a foldable and expansible link mechanism between the frame and central housing sections which prevents sidewise or lateral movement of the housing relative to the frame, yet permits the housing (1) to rise and fall relative to the chassis, (2) to rotate with respect to a longitudinal axis defined generally by the shaft 75, and (3) to tilt in either direction with respect to axes transverse to the normal path of advance. The upper legs 81 may be regarded as the upper link of the link mechanism and the lower legs 77 as the lower link. The wide spacing between the points of connection of the upper legs 81 with the cross-shaft 82 coupled with the downwardly converging arrangement of the legs, provides a substantially rigid link structure which allows optimum floating movement of the housing while still affording the requisite resistance to lateral displacement of the housing with respect to the frame in the event of forces exerted on the housing which would tend to shift it away to either side of the normal line of advance.

It should perhaps at this point be noted that if the tolerances in the front suspension and rearward link mechanism are exceedingly close, then it is advantageous to see that the center of the ball 62a is in line with and intersected by the axis of the link shaft 75. However, usual manufacturing tolerances permit of some variation from this condition.

Returning now to further consideration of the mower housing 47 and the makeup of its individual sections, it will be observed that wherever the leading edge is curved, I have provided spaced parallel vanes 90 through which grass passes into the housing as the mower advances. The vanes assist in preventing the grass from being pushed toward the outside of the curvature and in feeding it substantially upright into the cutting zone of the blade. The vanes have leading edges which extend slightly forwardly of the perimeter of the housing in the areas in which they are located. The usual spaced protector pins 91 can be utilized on the straight portions of the housing which are transverse to the line of advance since grass deflection is no real problem here.

While for the most part the blades are not shrouded by the housing, nevertheless, it is advisable to provide a depending shroud as at 49a and 50a on the wings 49 and 50 to guard against stones and other objects being thrown with great force laterally or to the rear of the housing outside the rear wheels.

The manner of operation of the invention, has, for the purposes of clarity and explanation of the structure, been incorporated largely in the foregoing description and should be readily apparent therefrom and from the drawings.

As the unit advances over the terrain, the blades 56, 57 and 58 are driven from the hydraulic pump 45 and will sever the grass in the usual fashion in a swath having a width substantially equal to the full span of the housing. The relatively widely spaced front wheels 22, by virtue of being located in close proximity to the leading edges of the wing sections 49 and 50 of the housing and to the sides of the central section 48, will serve to lift the frame as humps or hillocks are encountered and with it the lead portion of the housing through the front suspension connection 62, 63. At the same time, the rear ground engaging wheels W individually support the sections of the housing and follow ground contours, the front suspension connection and floating link mechanism permitting free rocking of the central section about longitudinal and transverse axes and the hinge connections between the wing sections 49 and 50, and the central section, permitting relative movement between the individual sections.

The elevated ground engageable rollers 70 disposed between the front wheels serve to lift the forward end of the housing relative to the chassis as elevations between the front wheels are encountered, and it will be evident that full rocking freedom of the housing is preserved in the lifted position due to the manner of construction of the front suspension connection.

The link mechanism represented by link members 77, 81 insures that the housing will continue to track in a straight line even though only one of the outer wheels W contacts a rise. In this situation a moment is created tending to swing the entire housing about a vertical axis through the front suspension. However, the link mechanism resists this moment. Obviously, too, the link mechanism still permits rocking to take place under these circumstances because of its pivotal connection with the housing.

The freedom provided in the front suspension connection for vertical displacement of the housing with respect to the chassis also makes possible the provision on the unit of means for lifting the housing to a non-operating position when it is desired to travel the unit along a highway or road. If desired, such means can be included on the frame in the form of winches and chains connected with the respective housing sections.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. In a riding type power operated mower, the combination of a chassis including a frame and front and rear wheels supporting said frame, power drive means mounted on said frame and connected with at least one of said wheels for propelling said chassis, a normally substantially horizontal mower housing positioned beneath said frame between said front and rear wheels, at least one horizontal rotary cutting blade mounted within said housing, a front suspension connection between said frame and said housing normally supporting the forward end of said housing from said frame above and free of contact with the ground, said suspension connection including structure operable to permit elevation of said forward end relative to said chassis and mounting said housing for independent rocking movement relative to said frame and wheels about axes running longitudinally and transversely with respect to the frame, ground engageable means connected with said forward end of said housing and normally spaced above the ground, ground engaging means connected with said housing and supporting same at points remote from said axes whereby to follow ground contours, guide link mechanism connecting said housing with said frame at points spaced rearwardly of said suspension connection and operable to confine the longitudinal axis of rocking movement to a normally substantially vertical plane running substantially longitudinally of the chassis, and means providing a flexible power drive from said chassis to said blade.

2. In a riding type power operated mower, the combination of a chassis including a frame and front and rear wheels supporting said frame, power drive means mounted on said frame and connected with at least one of said wheels for propelling said chassis, a normally substantially horizontal mower housing positioned beneath said frame between said front and rear wheels, at least one horizontal rotary cutting blade mounted within said housing, a first pivotal link member depending from said frame and pivotally connected at its upper end with the frame for confined swinging movement of the free end of the link member about a first link axis disposed transversely of the frame, a second link member extending upwardly from and pivotally connected with said housing for movement of its free end relative to said housing about a second link axis parallel with said first link axis, means pivotally connecting the free ends of said link members with one another, suspension means connecting the forward portion of said housing with and normally supporting it from the frame with the blade spaced above the ground level, a ground engaging means on the housing and engaging the ground at points spaced rearwardly of the suspension means, said suspension means constructed to permit rocking movement of said housing about an axis transverse to the frame.

3. In a riding type power mover, the combination of a chassis including a frame and front and rear wheels supporting said frame and defining a ground engaging plane, a normally substantially horizontal mower housing positioned beneath said frame between said front and rear wheels, at least one horizontal rotary cutting blade mounted within said housing, a suspension means connecting the forward portion of said housing with said frame and operable to permit limited up and down displacement of said front portion relative to the frame, said suspension means further constructed to permit rocking movement of said housing relative thereto about an axis parallel to the normal path of advance of the chassis and an axis substantially normal to the path of advance during said displacement, ground engageable means on the forward portion of the housing spaced above said ground engaging plane but operable to lift said forward portion independently of said wheels in response to pressures applied thereto, ground engaging means connected with and supporting said housing to the rear of said suspension means, and link mechanism connecting said housing with said frame at points spaced rearwardly of said suspension means and operable to permit said rocking movement and displacement of said housing but confining said housing against sidewise movement with respect to said frame.

4. The combination as in claim 3 wherein said housing comprises at least two sections, each said section having a rotary cutting blade mounted therein, and means hingedly connecting said sections with one another for relative movement about an axis parallel with the normal path of advance of the chassis.

5. The combination as in claim 4 wherein each said section includes said ground engaging means.

6. In a riding type power mower, the combination of a chassis including a frame and front and rear wheels supporting the frame, a normally substantially horizontal mower housing positioned beneath said frame between said front and rear wheels, at least one horizontal rotary cutting blade mounted within said housing, a front suspension element connnected with the frame and depending therefrom toward the forward portion of the frame, a suspension connector member affixed to said housing, means connecting said connector member with said suspension element whereby to permit up and down movement of the connector member relative to said suspension element and simultaneous rocking movement of said housing about axes running respectively longitudinally of the chassis and crosswise of the chassis, and a foldable and extensible link mechanism connecting said housing with said frame rearwardly of said connector member, said link mechanism operable to confine said housing against sidewise movement relative to said frame while permitting said rocking movement about all said axes.

7. The combination as in claim 6 including stop means operating to limit the downward movement of said connector member to a position in which said blade is spaced above the plane of engagement of said wheels with the ground.

8. The combination as in claim 6 including ground engageable means connected with the forward portions of said housing and operable to cause lifting of said housing independently of a change in attitude of the frame.

9. The combination as in claim 6 wherein said link mechanism includes a sleeve affixed to said housing and aligned generally with the normal path of advance of said chassis and a shaft journaled in said sleeve whereby to permit rocking movement of said housing relative to said link mechanism.

10. In a riding type power mower, the combination of a chassis including a frame and front and rear wheels supporting the frame, a normally substantially horizontal mower housing positioned beneath said frame between said front and rear wheels, at least one horizontal rotary cutting blade mounted within said housing, a sleeve affixed to the top of said housing and extending longitudinally with respect to said chassis, a shaft journaled in said sleeve, a pair of interconnected link members including an upper link member and a lower link member, means pivotally connecting the lower link member with said shaft for movement with respect thereto about a first axis normal to the shaft axis, means pivotally connecting the upper link member with the frame for movement with respect thereto about a second axis parallel to said first axis, suspension means connecting the forward portion of the housing with the frame, and ground engaging means connected with said housing and supporting said housing at points remote from said axes whereby to follow ground contours and cause rocking movement of said housing with respect to said axes.

11. The combination as in claim 10 wherein said suspension means is constructed to permit upward displacement of said housing relative to said frame in response to an upward force on said housing.

12. The combination as in claim 10 wherein said housing comprises three sections in the form of a central section and two opposed laterally extending wing sections, said sleeve affixed to said central section, and each wing section hingedly connected with said central section, each section having mounted therein a rotary cutter blade, and ground engaging means on each section.

References Cited in the file of this patent
UNITED STATES PATENTS

| | | |
|---|---|---|
| 2,743,567 | Martin | May 1, 1956 |
| 2,801,510 | Colburn | Aug. 6, 1957 |
| 2,862,343 | Wood | Dec. 2, 1958 |
| 2,928,223 | Danuser | Mar. 15, 1960 |
| 2,949,004 | Jones | Aug. 16, 1960 |
| 2,972,850 | Ariens et al. | Feb. 28, 1961 |